United States Patent
Jierian et al.

(10) Patent No.: US 12,496,871 B2
(45) Date of Patent: Dec. 16, 2025

(54) HVAC AIR VENT PATTERNS

(71) Applicant: Rivian IP Holdings, LLC, Plymouth, MI (US)

(72) Inventors: Danny Jierian, Diamond Bar, CA (US); Graham Lloyd Feltham, Irvine, CA (US); Kamalesh Bhambare, Novi, MI (US)

(73) Assignee: Rivian IP Holdings, LLC, Plymouth, MI (US)

( * ) Notice: Subject to any disclaimer, the term of this patent is extended or adjusted under 35 U.S.C. 154(b) by 325 days.

(21) Appl. No.: 18/107,907

(22) Filed: Feb. 9, 2023

(65) Prior Publication Data

US 2024/0208294 A1 Jun. 27, 2024

Related U.S. Application Data

(60) Provisional application No. 63/434,139, filed on Dec. 21, 2022.

(51) Int. Cl.
*B60H 1/00* (2006.01)

(52) U.S. Cl.
CPC ..... *B60H 1/00735* (2013.01); *B60H 1/00285* (2013.01)

(58) Field of Classification Search
CPC ............ B60H 1/00735; B60H 1/00285; B60H 1/0065; B60H 1/00985; B60H 1/00742; B60H 1/00871
See application file for complete search history.

(56) References Cited

U.S. PATENT DOCUMENTS

| 2018/0215237 A1* | 8/2018 | Balcerzak | B60H 1/3414 |
| 2021/0276463 A1* | 9/2021 | Wolas | B60H 1/00478 |
| 2021/0316711 A1* | 10/2021 | Wu | B60W 50/0098 |

* cited by examiner

*Primary Examiner* — Ashley L Redhead, Jr.
(74) *Attorney, Agent, or Firm* — Haley Guiliano LLP

(57) ABSTRACT

A system and method are provided for a ventilation system in, for example, a vehicle. The ventilation system is configured to direct airflow relative to a user's position in the vehicle. The system may determine a first curved flow path and a second curved flow path and cause the ventilation system to direct a first airflow to the first curved flow path and direct a second airflow to the second curved flow path.

20 Claims, 7 Drawing Sheets

HVAC AIR VENT PATTERNS

CROSS-REFERENCE TO RELATED APPLICATION

This application claims priority to U.S. Provisional Patent Application No. 63/434,139, filed on Dec. 21, 2022, the entire contents of which are hereby expressly incorporated by reference in their entirety.

INTRODUCTION

The present disclosure is directed to an improved ventilation (e.g., cooling and/or heating) system, and more particularly, to a system that controls the direction of airflow to provide a more comforting experience.

SUMMARY

Some vehicles include vents for a ventilation system (e.g., cooling and/or heating) that may be controlled to direct airflow toward an occupant of a vehicle. However, the occupant may desire varied airflows that imitate real world conditions (e.g., an ocean breeze) or are not directed to a single body part of the occupant. Consequently, what is needed is a system for automatically controlling the direction of airflow to follow one or more curved flow paths (e.g., two-dimensional flow paths) so that enjoyability and comfort of the occupant may be improved.

To solve one or more of these problems, systems and methods are provided to direct airflow along one or more curved flow paths. The system includes a ventilation system configured to direct airflow, and processing circuitry coupled to the ventilation system. The processing circuitry is configured to determine a first curved flow path and a second curved flow path and cause the ventilation system to direct a first airflow to the first curved flow path and direct a second airflow to the second curved flow path.

In some embodiments, at least a portion of the first curved flow path and the second curved flow path may intersect, and the intersection may redirect the first curved flow path and the second curved flow path.

In some embodiments, the processing circuitry may be configured to determine a selection of the first curved flow path and the second curved flow path based on a user input that selects the first curved flow path and the second curved flow path from a plurality of predetermined flow paths.

In some embodiments, the system may further include a touchscreen, and the processing circuitry may be configured to cause the touchscreen to display a plurality of predetermined flow paths; and determine a selection of the first curved flow path and the second curved flow path based on a user input received by the touchscreen that indicates a selection of the first curved flow path and the second curved flow path from the plurality of predetermined flow paths.

In some embodiments, the system may further include a touchscreen, and the processing circuitry may be further configured to determine the first curved flow path and the second curved flow path based on detecting, from the touchscreen, user gestures that indicate a shape of each of the first curved flow path and the second curved flow path.

In some embodiments, the processing circuitry may be configured to determine a path speed based on a user input, and cause the ventilation system to direct the first airflow to the first curved flow path by causing the ventilation system to direct the first airflow to follow the first curved flow path at the determined path speed.

In some embodiments, the first curved flow path and the second curved flow path may be relative to a vehicle seat and the processing circuitry may be further configured to determine a location of the vehicle seat and cause the ventilation system to direct the first airflow to the first curved path and the second airflow to the second curved path based on the location of the vehicle seat.

In some embodiments, the processing circuitry may be configured to determine a location of a user in a vehicle seat based on seat position information of the vehicle seat occupied by a user; and a captured image of the user. The processing circuitry may be configured to cause the ventilation system to direct the first airflow to the first curved path and the second airflow to the second curved path based on the location of the user in the vehicle seat.

In some embodiments, the processing circuitry may be configured to cause the ventilation system to direct the first airflow to the first curved flow path and direct the second airflow to the second curved flow path by causing the ventilation system to repeatedly follow the first curved flow path in alternating directions and to repeatedly follow the second curved flow path in alternating directions.

In some embodiments, the processing circuitry may be configured to cause the ventilation system to direct the first airflow to the first curved flow path and direct the second airflow to the second curved flow path by causing the ventilation system to sequentially follow the first curved flow path and the second curved flow path.

In some embodiments, a method is provided. The method includes determining a first curved flow path and a second curved flow path and causing a ventilation system to direct a first airflow to the first curved flow path and direct a second airflow to the second curved flow path.

In some embodiments, at least a portion of the first curved flow path and the second curved flow path may intersect, and the intersection may direct the first airflow to the first curved flow path and direct the second airflow to the second curved flow path.

In some embodiments, determining the first curved flow path and the second curved flow path may include one of determining a selection of the first curved flow path and the second curved flow path based on a user input that selects the first curved flow path and the second curved flow path from a plurality of predetermined flow paths; or detecting, from a touchscreen, user gestures that indicate a shape of each of the first curved flow path and the second curved flow path.

In some embodiments, the first curved flow path and the second curved flow path may be relative to a vehicle seat. The causing the ventilation system to direct the first airflow to the first curved flow path and direct the second airflow to the second curved flow path may include determining a location of the vehicle seat; and causing the ventilation system to direct the first airflow to the first curved path and the second airflow to the second curved path based on the location of the vehicle seat.

In some embodiments, causing the ventilation system to direct the first airflow to the first curved flow path and direct the second airflow to the second curved flow path may include causing the ventilation system to repeatedly follow the first curved flow path in alternating directions and to repeatedly follow the second curved flow path in alternating directions.

In some embodiments, a vehicle is provided. The vehicle includes an HVAC system configured to provide conditioned air, the HVAC system including an air vent configured to direct airflow of the conditioned air. The vehicle further includes processing circuitry, coupled to the HVAC system, configured to: determine a first curved flow path and a second curved flow path; and cause the air vent to direct a first airflow of the conditioned air to the first curved flow path and direct a second airflow of the conditioned air to the second curved flow path.

In some embodiments, at least a portion of the first curved flow path and the second curved flow path may intersect.

In some embodiments, the processing circuitry is configured to determine a selection of the first curved flow path and the second curved flow path based on a user input that selects the first curved flow path and the second curved flow path from a plurality of predetermined flow paths; or a detection, from a touchscreen, of user gestures that indicate a shape of each of the first curved flow path and the second curved flow path.

In some embodiments, the first curved flow path and the second curved flow path may be relative to a user, and the processing circuitry may be further configured to determine a location of the user and cause the ventilation system to direct the first airflow of the conditioned air to the first curved path and the second airflow of the conditioned air to the second curved path based on the location of the user.

In some embodiments, the vehicle may further include an adjustable vehicle seat and a camera. The processing circuitry may be further configured to receive at least one of seat position information of the adjustable vehicle seat or an image of the user captured by the camera. The processing circuitry may be further configured to determine the location of the user based on one of the seat position information or the image of the user.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

The present disclosure is directed to methods and systems for a ventilation system of a vehicle. These systems and methods direct ventilation in the vehicle along one or more curved flow paths.

In some embodiments, the ventilation system, or ventilation system of a vehicle, may include at least one air vent, otherwise known as, and used interchangeably with, the term vent, (e.g., air vents 210, 220, 230, 240 of FIG. 2) which provides conditioned or heated air to a user. In some embodiments, each or some air vents of air vents 210-240 may include one or more controllable features 210b, 220b such as fins, spouts, grills, or other mechanisms for directing airflow, which may be moved (e.g., rotated or translated) via at least one motor or actuator. In some embodiments, a single motor can control both vertical and horizontal orientation of the fins or other controllable features. In some embodiments, one motor may control horizontal orientation of the fins, while another motor may control vertical orientation of the fins. In some embodiments, fins of the vent can be oriented to direct air from the vent in any suitable direction inside the vehicle (e.g., to one or more curved flow paths).

In some embodiments, the vehicle ventilation system may include processing circuitry coupled to the ventilation system that is capable of interfacing with a display and with a vent controller, and that can configure the controllable features 210b, 220b of air vents 210-240 of the vehicle (e.g., by actuating at least one motor). In some embodiments, the processing circuitry may be capable of configuring the plurality of controllable features such that the vent directs air to one or more curved flow paths according to a selected preference. Information regarding the location of the selected preference may be determined based on information collected from a camera, a computer vision algorithm, and seat position. For example, if the user 250 of FIG. 2 has selected to direct air along a curved flow path that crosses the chest of the driver via the interface, the processing circuitry uses at least one motor to move controllable features 210b, 220b, such that the vent directs the air along the curved flow path relative to the chest of the driver. In some embodiments, some or all of vents 210-240 that are controlled by processing circuitry may lack any kind of manual control of the controllable features 210b, 220b (e.g., the fins may be concealed behind the faceplate of the vent.) This allows vents 210-240 to be placed in any location of the vehicle, even where it is not reachable by the driver or passengers.

Figure 2:
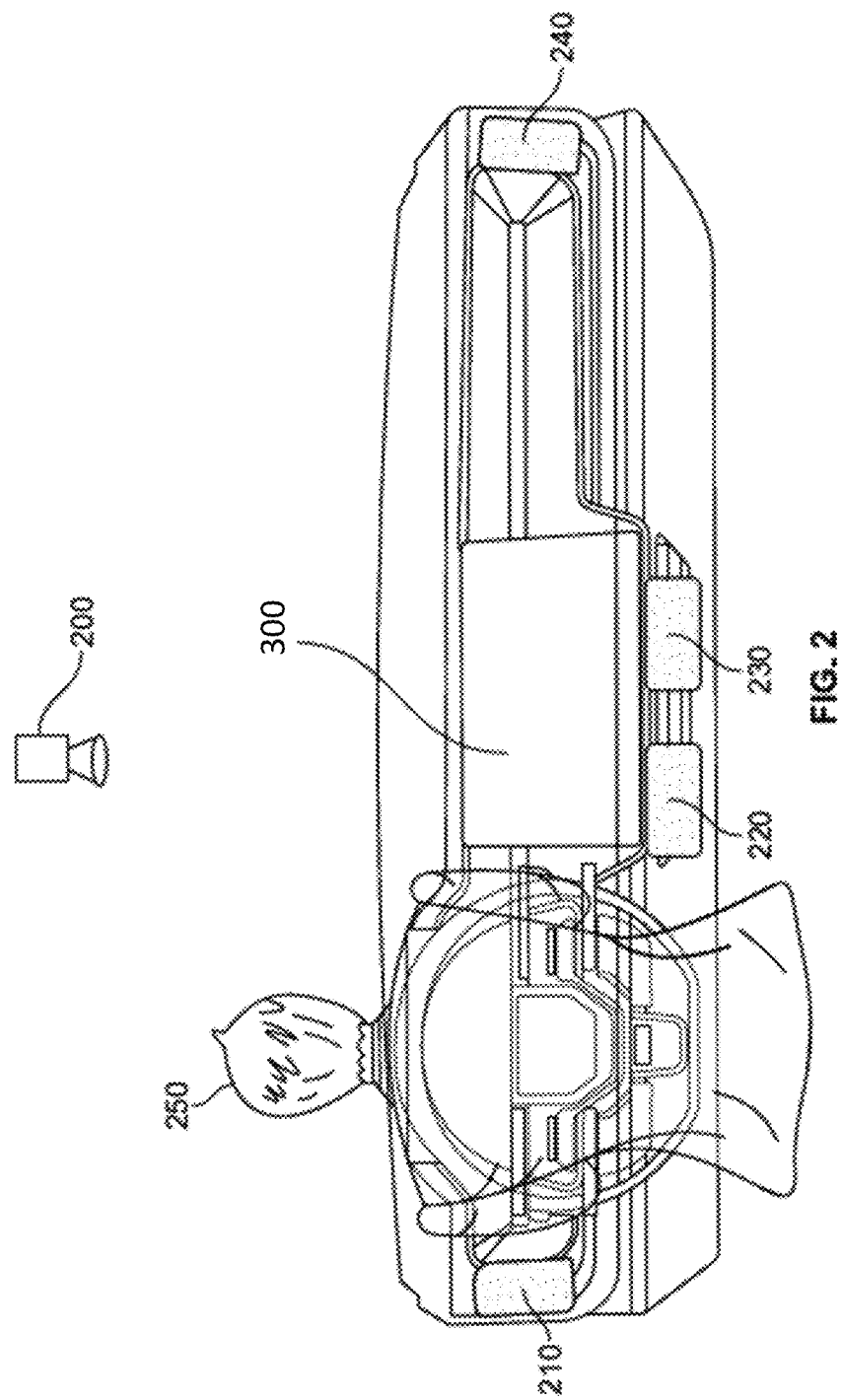
FIG. 2 shows an illustration of a front view of a dashboard of a vehicle with a user at the steering wheel, in accordance with some embodiments of the present disclosure.

In some embodiments, the vehicle includes one or more internal cameras 200 of FIG. 2 capable of receiving captured images of the driver or other passengers. In some embodiments, a computer vision algorithm processes the images of the camera 200. In some embodiments, the computer vision algorithm identifies the user or user's body parts. The computer vision algorithm in some embodiments recognizes the position of a user or specific body parts (i.e., ears, neck, or chest) of the user 250 within the vehicle based on the captured image or images. For example, the computer vision algorithm may recognize the outline of a person in a seat in a vehicle. It may also use image recognition software to recognize a face within the vehicle by locating eyes or other facial features. Once it has recognized a face, it may use that information to find the user's head, neck, or other body parts.

Figure 3A:
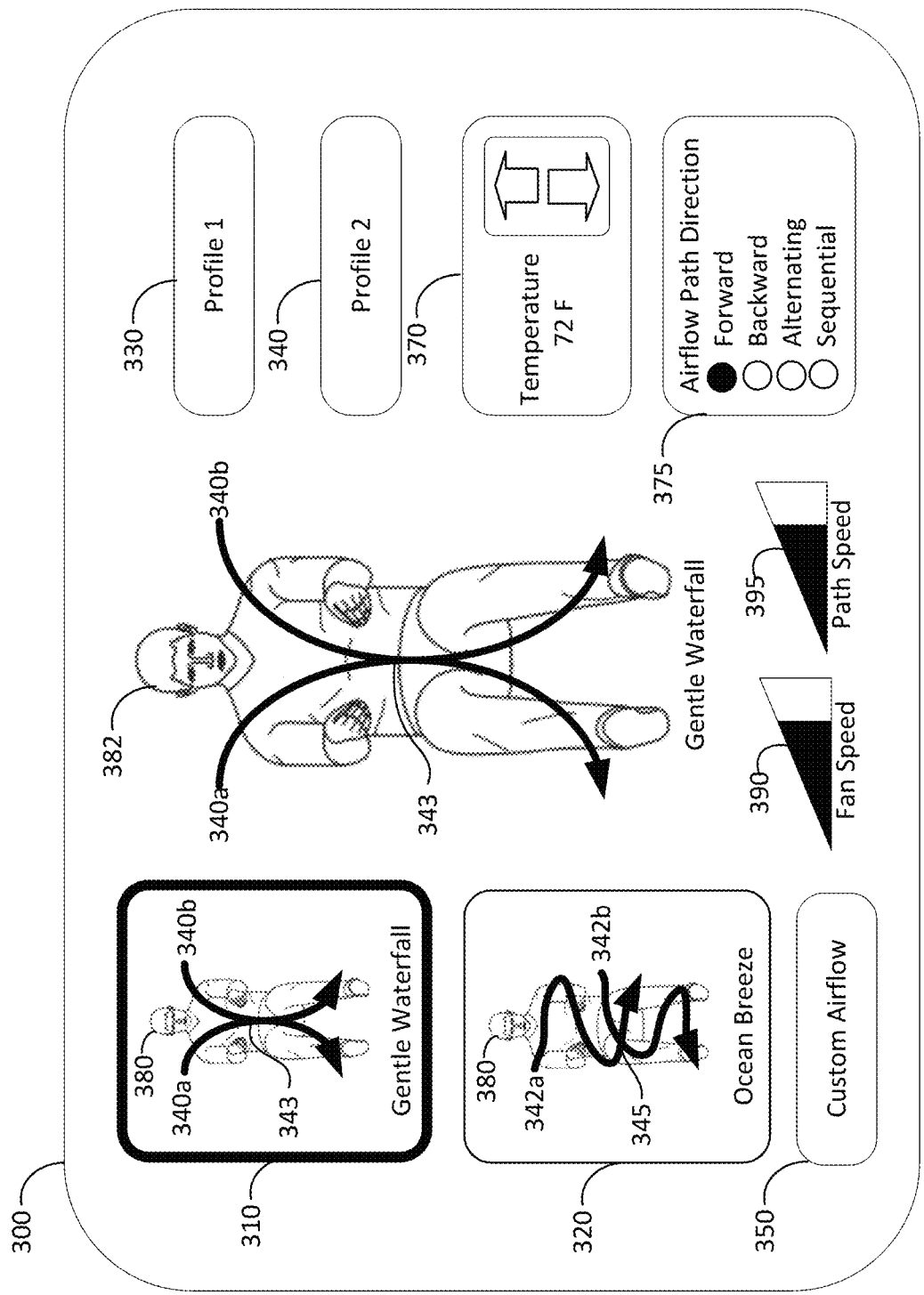
FIG. 3A shows an illustration of a display of a vehicle, in accordance with some embodiments of the present disclosure.
Figure 3B:
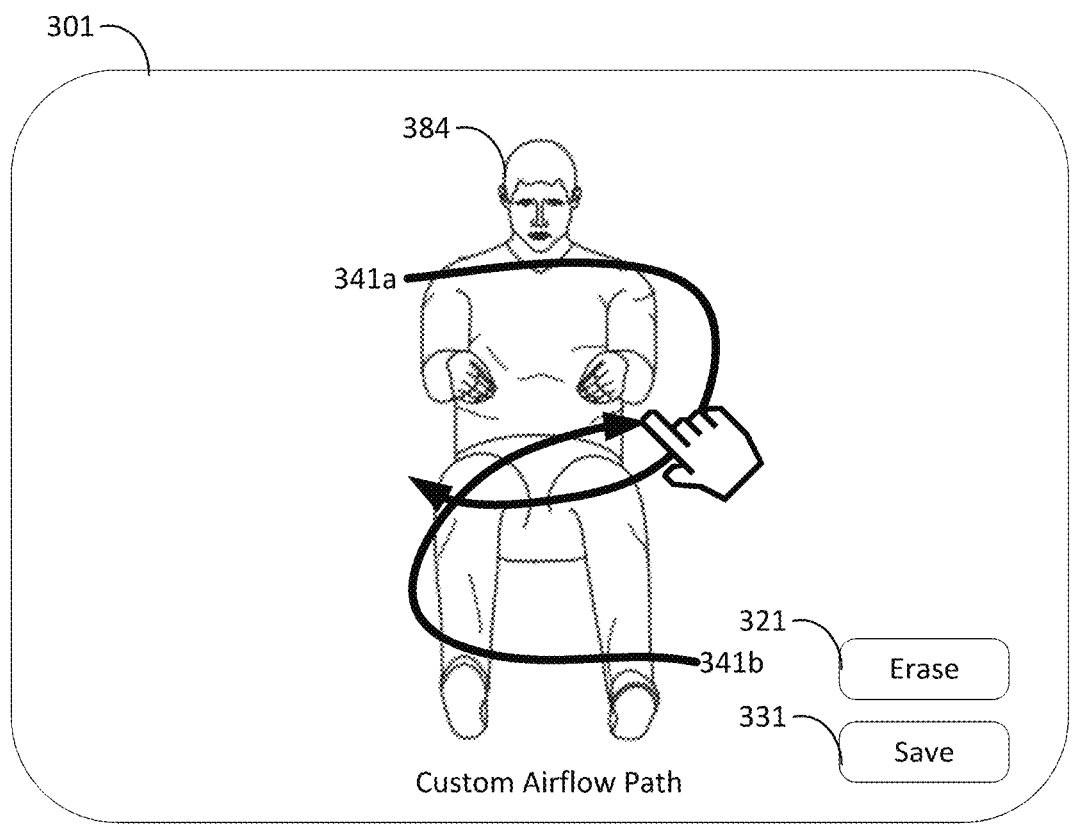
FIG. 3B shows an illustration of an interface on the display of a vehicle, in accordance with some embodiments of the present disclosure.

In some embodiments, the vehicle ventilation system may include a display such as a touch screen display 300 of FIG. 3A or another type of a user interface. In some embodiments, the touch screen may display an object to assist a user in directing the airflow of air vents 210-240. For example, the touch screen may display icons representing different preferences for airflow for the user to choose from (e.g., curved flow paths). Some embodiments may include other user interfaces and displays. In some embodiments, the display includes an option to adjust temperature, fan speed, or direction of travel along one or more curved flow paths. In some embodiments, the display displays an interface for a user to input one or more desired curved flow paths, as shown in FIG. 3B.

In some embodiments, users, either the driver or passengers, will have general airflow preferences, such preferences to direct airflow along particular curved flow paths (e.g., selected or generated by the users). In some embodiments, a user 250 may prefer fixed fan speeds. Another user might prefer variable fan speeds. In some embodiments, a user may select a preference from the display 300 of FIG. 3A that best matches his or her own preference. In some embodiments, a number of preferences may be available to a user 250, as explained in further detail with reference to FIG. 3A. In some embodiments, a user may save his or her chosen preferences as a saved user profile, which applies the selected options without requiring the user to select his or her preferences again. In some embodiments, a user 250 may direct airflow by voice command and may reference one or more specific curved flow paths (e.g., "Gentle Waterfall" of FIG. 3A). For example, in vehicles using Amazon Alexa, a user 250 may direct airflow along a custom flow path (e.g., Gentle Waterfall) to his or her ears by saying, "Alexa, direct airflow based on the Gentle Waterfall flow paths." To match these preferences accurately relative to the user, the direction of airflow can be determined specifically for every user.

User positioning in a vehicle varies widely based on the size and shape of the individual as well as his or her position and posture in the vehicle. For example, it is common for a husband and wife to share a vehicle where the husband and wife are different heights and may have different airflow preferences. Vents set to direct air to the face of a shorter person sitting far back from the steering wheel might only reach the chest of a taller person sitting close to the steering wheel. Similarly, a person who begins his or her drive with straight posture might slouch and lean on one side after several hours in the car, thereby moving the position of his or her body. That person might further reposition the seat, moving his or her body yet again. While the vents 210-240 might be properly set for that person initially, after several hours, his or her body has moved and the vents 210-240 will no longer align the one or more curved flow paths relative to their intended target. Given this wide range of variation, in some embodiments it is important that any targeted direction of the vents relative to the user's position be customized to that specific user.

In some embodiments, the position of the user may be identified using information or images collected from the camera 200 and processed by the computer vision algorithm. In some embodiments, identifying the position of the user may comprise using information or images collected from the camera 200 and processed by the computer vision algorithm to identify the user. In some embodiments, identifying the user in the collected images comprises identifying a body part of the user in the images. In some embodiments, the system may direct the vents 210-240 according to the information or images collected from the camera 200 and processed by the computer vision algorithm. In some of these embodiments, the images from the camera 200 and their processing via the computer vision algorithm can inform the ventilation system of the position of the user 250. As described above, the computer vision algorithm may, for example, use images to create an outline of the user or find the user's face within the vehicle. Using this information, the system may then find the relevant body parts. Once the positions of the relevant body parts are determined, the system may then direct the vent 210 in the appropriate direction along the one or more selected flow paths. For example, if a user 250 wants air directed along a curved flow path that crosses his or her chest, the system may capture an image of the user 250 using the camera, process that image, and determine the position of the user's chest within the vehicle. It may then direct air along the one or more selected flow paths relative to the user's chest as requested.

In some embodiments, the system may also determine the position of the user 250 in part based on the position of his or her seat in the vehicle (e.g., vehicle seat). In some embodiments, the position of the seat is digitally controlled. In some embodiments, the system may collect and relay information regarding the position of the seat to the processing circuitry, where the information is considered in determining the position of the user 250. For example, the system may rely primarily on the image of the user 250 captured by the camera. However, the camera may not accurately account for depth. The camera may capture an image of a user in a position wherein the user is in a specific location in the image. Another user farther back in position and having a different height than the first user could be in the same sightline of the camera. For example, a shorter user sitting further back from a tall user could appear in the same location in the image the camera 200 captured. To the camera, these two users may appear in the same position despite being in different positions. In such scenarios, embodiments of the disclosure may consider the seat position of the user to assist in determining the position of the user within the vehicle. In some embodiments, the system estimates where the user is based on a typical position of a seat.

A display 300 may be presented to a user 250 in one embodiment. In some embodiments, the display 300 may be configured to receive one or more user inputs, including selections of preferences from an object displayed on the touch screen. The display 300 can present various presets to the user for the user to select, such as: Gentle Waterfall, Ocean Breeze, custom airflow, airflow path direction, fan speed, and saved user Profiles 1 and 2. The user may choose one or a combination of these options that describe his or her preferences for airflow direction. Once chosen, the processing circuitry of the system may configure the plurality of controllable features 210*b*, 220*b* of some or all vents 210-240 based on the selections of the user. In some embodiments the processing circuitry may rely on information from a camera 200 to determine a location within the vehicle that corresponds to the chosen selection. In some embodiments, information from a camera 200 is processed using a computer vision algorithm. For example, the processing circuitry may determine the position of the user based on images from the camera 200 and configure the controllable features to direct air along the selected curved flow paths relative to the user (e.g., as shown in FIGS. 3A and 3B). In some embodiments, the airflow may be directly automatically with no input from the user 250. For example, the processing circuitry may direct the vents along a default flow path relative to every driver or passenger whenever an image from the camera 200 informs the system that a driver or passenger is present in the vehicle. In some embodiments, the user may further customize the airflow. For example, once the processing circuitry has set the controllable feature 210b, 220b, the user may communicate to the processing circuitry via a display, that the processing circuitry should raise or lower the vent positions. In some embodiments, the processing circuitry adjusts the vent position via the controllable feature 210b, 220b to maintain the user selection as the user adjusts his or her own position within the vehicle.

Figure 1:
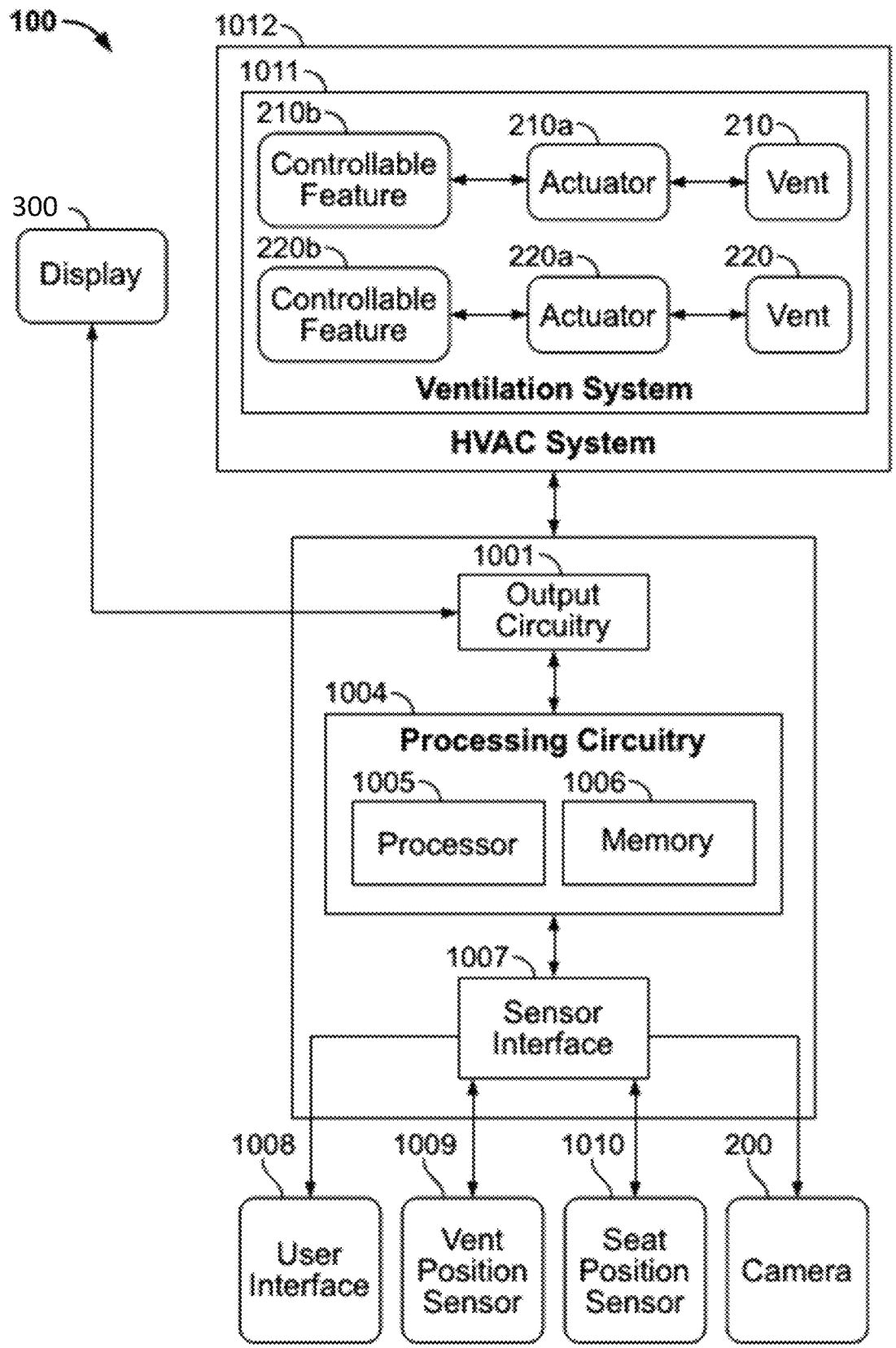
FIG. 1 shows a block diagram of components of a ventilation system of a vehicle, in accordance with some embodiments of the present disclosure.

FIG. 1 shows a block diagram of components of a ventilation system 100 of a vehicle, in accordance with some embodiments of the present disclosure. In some embodiments, system 100 may include processor 1005. Processor 1005 may comprise a hardware CPU for executing commands stored in memory 1006 or software modules, or a combination thereof. In some embodiments, processor 1005 and memory 1006, in combination, may be referred to as processing circuitry 1004 of system 100. In some embodiments, processor 1005 alone may be referred to as processing circuitry 1004 of system 100.

In some embodiments, system 100 may include memory 1006. In some embodiments, memory 1006 may include hardware elements for non-transitory storage of commands or instructions, that, when executed by processor 1005, cause processor 1005 to operate system 100 in accordance with embodiments described above and below.

In some embodiments, processing circuitry 1004 may be communicatively connected (e.g., via a sensor interface 1007) to camera 200. In some embodiments, camera 200 may be controlled via directions from processing circuitry 1004. Information from the camera 200, such as image data, may be processed by a computer vision algorithm implemented on processing circuitry 1004.

In some embodiments, processing circuitry 1004 may be communicatively connected to display 300 via, for example, output circuitry 1001. In some embodiments, display 300 provides a user interface for displaying information. In some embodiments, display 300 may be for example a touch screen display and may receive input from the user 250 as well.

In some embodiments, processing circuitry 1004 may be communicatively connected to the controllable feature of the vents 210b, 220b, for example, vents 210 and 220, through connection to the vent motor or actuator 210a and 220a. Vents 210 and 220 may each be controllable by motor and/or actuator 210a and 220a to change position as to control the flow of air in a selectable direction (e.g., to follow along a curved flow path). Vent systems and controls are described in greater detail in commonly assigned Skapof et al. U.S. Pat. No. 11,091,009, issued Aug. 17, 2021, which is hereby incorporated by reference herein in its entirety. The vents 210 and 220 may be part of a ventilation system 1011 which is part of the vehicle's HVAC system 1012. Ventilation system 1011 and HVAC system 1012 may include additional vents, such as vents 230 and 240 seen in FIG. 2, that are controlled similarly to vents 210 and 220. The vents 210 and 220 may be used to direct air according to user preferences. For example, processing circuitry 1004 may use information received from camera 200, vent position sensor 1009, and seat position sensor 1010 to determine where to direct vents 210 and 220.

In some embodiments, processing circuitry 1004 may be communicatively connected to user interface 1008, for example via sensor interface 1007. User interface 1008 may receive instructions from the user 250 such as selections chosen via display 300. In some embodiments, processing circuitry 1004 may be communicatively connected to vent position sensor 1009, for example via sensor interface 1007. Vent position sensor may collect data used to determine the position of a vent, such as vent 210, so that the vent may be repositioned according to received input from the user 250. In some embodiments, processing circuitry 1004 may be communicatively connected to seat position sensor 1010, for example via sensor interface 1007. Seat position sensor 1010 may receive data and seat position information used to determine the position of the seat of the user 250 which may be used to determine the position of user 250 within the vehicle.

FIG. 2 shows an illustration of a front view of a dashboard of a vehicle with a user 250 at the steering wheel, in accordance with some embodiments of the present disclosure. In some embodiments, a camera 200 is positioned above the user or in any position in which the user 250 will be visible to camera 200 (e.g., near the vehicle's rearview mirror). In front of user 250 is a dashboard having a plurality of vents, 210, 220, 230, and 240 (e.g., as part of ventilation system 1011). The vents 210-240 route air into the passenger cabin of the vehicle. Movable fins or other controllable feature 210b, 220b direct the air from the vents in a selected direction (e.g., to follow along a curved flow path). The fins are connected to a motor or other mechanism which controls and moves the fins. Processing circuitry, such as processing circuitry 1004, controls the mechanism of the fins (e.g., using an actuator). A vehicle of the present disclosure can include a number of vents 210-240 in different locations to direct air from various points and along various flow paths, creating an atmospheric effect of the user feeling surrounded in a temperate environment from all sides.

In some embodiments, some (or all) of vents 210-240 may include fins to control direction of the airflow. For example, each vent may include fins that can control horizontal and vertical direction of the airflow. In some embodiments, the fins may be driven by at least one motor under control of the processing circuitry 1004. In some embodiments, the processing circuitry 1004 may control the directions of the fins or other controllable feature 210b, 220b as described above and below.

In some embodiments, the ventilation system 1011 may include four face duct routes from the ventilation system 1011 (e.g., a cooling system and heating system) to four outlets. In some embodiments, the vent system may include two foot duct routes from the ventilation system 1011 to two outlets in a footwell of the vehicle (e.g., one each side). In some embodiments, the ventilation system 1011 may include three defrost routes (e.g., one duct to the front glass, one duct to driver side glass, and one duct to passenger side glass). In some embodiments, the ventilation system 1011 may include valves to divert air into one or more of these duct routes. In some embodiments, vents 210-240 may have motorized moving controllable features 210b, 220b that are hidden from the users of the vehicle behind a fixed cage or grill. In some embodiments, each motor (e.g., actuator 210a, 220a) can be directed such that airflow follows one or more curved flow paths (e.g., two-dimensional flow paths).

In some embodiments, fins or other controllable features 210b, 220b of the vents 210-240 are motorized. For example, each vent may have a motor to control horizontal orientation of the fins, and one motor to control the vertical orientation of the fins (e.g. there may be eight total motors or actuators). For example, a motor can drive the fins to have vertical rotation angle of 40 degrees and horizontal rotation angle of 20 degrees to achieve a flow path target (e.g., flow path selected via a touchscreen).

In some embodiments, the ventilation system 1011 may include an assembly for driving air to all other ducts (e.g., by operation of a compressor, a pump, a fan, or a vacuum). In some embodiments, the ventilation system 1011 may include several different vent ducts. For example, ventilation system 1011 may include several vent ducts for one or more vents. In some embodiments, the vehicle may include face ducts, foot ducts, ambient air duct, and windshield defrost duct. In some embodiments, the processing circuitry 1004 of the vehicle may control airflow from each of the ducts using a respective valve for each duct. For example, the processing circuitry 1004 may completely close a valve to stop all airflow, or partially open a valve to control the rate of the airflow. In some embodiments, ducts may be closed based on occupancy of the vehicle which may be determined using deep learning models. In some embodiments, the processing circuitry 1004 of the vehicle may control airflow from each of the ducts using a respective blower motor or fan for each duct.

In some embodiments, air can be automatically fully turned off at each of vents 210-240 by turning the controllable feature 210*b*, 220*b* (using a motor) completely to the left, completely to the right, completely up, or completely down. In some embodiments, the ventilation system 1011 may be configured without valves (e.g., flow control valves described above), because airflow can be stopped and started at each valve outlet using the motorized fins.

FIG. 3A shows an illustration of a display 300 of a vehicle, in accordance with some embodiments of the present disclosure. In some embodiments, display 300 is a touch screen or another user interface and input. In some embodiments, display 300 presents the user with preset options 310-340. Options may include, for example, a plurality of predetermined flow paths such as Gentle Waterfall 310 and Ocean Breeze 320. Alternatively or in addition, preset options may include a profile that encompasses a user's saved preferences, such as Profile 1 330 and Profile 2 340. In some embodiments, different predetermined or custom flow paths may be displayed based on the user's profile. In some embodiments, a user 250 may use more than one profile. For example, a user 250 may save a warm weather profile and a cold weather profile. In another embodiment, one profile may be associated with one driver while another profile is associated with another driver. In some embodiments, a user 250 may select the option he or she prefers. The system will then direct the vent or vents to a default flow path (e.g., Ocean Breeze 320) or predetermined or custom flow paths may be displayed based on the selection of the user profile. In some embodiments, the system may learn from collected data and predict patterns in a user's selection. For example, the system may suggest options, such as a cabin temperature and fan speed in response a current weather forecast. In another example, the system may learn that the user of Profile 1 330 often adjusts a setting after a certain period of time and suggest or automatically perform the same adjustment when the period of time has passed. In another example, the system may suggest presets that correspond to the current vehicle location or navigation route (e.g., Ocean Breeze 320 when the vehicle is located near and/or traveling to the ocean). In some embodiments, the display 300 may illustrate a selected preset as an enlarged user representation 382. In some embodiments, a selection will apply to one or more users, e.g., the driver and front seat passenger. In some embodiments, selections may be user-specific. In some embodiments airflow over the driver and the passenger may be controlled separately.

As shown, Gentle Waterfall 310 may be an airflow preset in which a first airflow is directed to first curved flow path 340*a* and a second airflow is directed to second curved flow path 340*b*. In some embodiments, first curved flow path 340*a* and second curved flow path 340*b* may be arranged with respect to user 250 (e.g., as shown by a user representation of a user 380). In some embodiments, the first curved flow path 340*a* and the second curved flow path 340*b* intersect at point 343. Although one intersection point is shown, it should be understood that the first curved flow path 340*a* and the second curved flow path 340*b* may intersect more than once. In some embodiments, the first curved flow path 340*a* and the second curved flow path 340*b* may not intersect. When Gentle Waterfall 310 is selected, an enlarged representation of a user 382 may be displayed along with first and second curved flow paths 340*a*, 340*b*. In some embodiments, a user 250 may adjust the location of the first and second curved flow paths 340*a*, 340*b* relative to the enlarged representation of a user 382. The system will then direct the vent or vents and corresponding airflow to follow along the flow paths in an airflow path direction (e.g., indicated by the arrows for first and second curved flow paths 340*a*, 340*b*) at a path speed. In some embodiments, the airflow path direction may be adjusted by a user 250 using airflow path direction icon 375 (e.g., forward, backward, alternating, or sequential). For example, the airflow may be adjusted to independently follow along each of the first and second curved flow paths 340*a*, 340*b* in a forward direction, a backwards direction opposite the forward direction, or in alternating directions (e.g., forward and then backward). In some embodiments, the airflow may be adjusted to sequentially follow along the first curved flow path 340*a* and then the second curved flow path 340*b* (e.g., in any direction). In some embodiments, the airflow path speed (e.g., the speed at which a vent traverses a flow path) may be adjusted by a user 250 using path speed icon 395. In some embodiments, the path speed may be adjusted within a predetermined range based on the length of the path. For example, the path speed may be adjusted to traverse a path in a range of 10 seconds-30 seconds. However, this is only one example, and any suitable path speed may be set. The intensity of the first and second airflows may be adjusted by a user using fan speed icon 390. In some embodiments, the fan speed may be variable based on the selected preset. For example, the fan speed may randomly or semi-randomly vary within a predetermined amount of the fan speed setting to mimic a natural world environment (e.g., a waterfall or ocean breeze).

Another option is Ocean Breeze 320. As shown, Ocean Breeze 320 may be an airflow preset in which a first airflow is directed to first curved flow path 342*a* and a second airflow is directed to second curved flow path 342*b*, which intersect at point 345. As described above, the airflows may be adjusted using airflow path direction icon 375, fan speed icon 390, and path speed icon 395. In some embodiments, the intersection may redirect the flow paths. For example, the intersection at point 345 may redirect the first curved flow path 342*a* and the second curved flow path 342*b*. For example, if a first vent is directing the first airflow to the first curved flow path 342*a* and a second vent is directing the second airflow to the second curved flow path 342*b* and the first airflow and the second airflow reach the intersection point 345 at the same time, the first and the second vent may swap flow paths. That is, the first vent may direct the second airflow for the remainder of the second curved flow path 342*b*, while the second vent may direct the first airflow for the remainder of the first curved flow path 342*a* (or until the first curved flow path 342*a* and the second curved flow path 342*b* intersect again). In this way, airflows directed from the first and second vents do not actually cross, air turbulence felt by the user 250 (e.g., as shown by the user representation of the user 380) may be reduced so that the user 250 may accurately perceive the airflows directed to each of the first curved flow path 342*a* and the second curved flow path 342*b*.

In some embodiments, display 300 may also be configured to receive a temperature selection. For example, the display 300 may show a temperature value which may be adjusted by the user via, for example, virtual temperature arrows or a virtual dial in temperature icon 370. In some embodiments, the ventilation system 1011 may include a thermometer for determining the temperature of the vehicle cabin or of the user. In some embodiments, the temperature of the user may be determined based on information received from the camera 200. For example, the camera 200 may detect a slight expansion of the user's face, indicating an increase in temperature. In some embodiments, the ventilation system 1011 may adjust the temperature based on a determined temperature of the cabin or of the user 250. In some embodiments, the processing circuitry 1004 may adjust the temperature of air delivered via the air vent based on a temperature selection. For example, the processing circuitry 1004 may engage one of cooling system or heating system of the vehicle based on the selection. In some embodiments, the processing circuitry 1004 may also control valves of some or all of vents 210-240 to further control the temperature. In some embodiments, the ventilation system 1011 may orient airflow based on the temperature of the vehicle cabin. For example, in some embodiments, the system may adjust the airflow paths to intersect with the face of a user after getting inside of a vehicle that is uncomfortably warm or cold but later direct airflow away from his or her face once the user 250 becomes comfortable. This operation may be learned by the system so that location of the flow paths relative to the user 250 is automatically adjusted from one area of the user 250 to another area of the user 250 after a predetermined time. In some embodiments, the system may wait to display the predetermined flow paths (e.g., Gentle Waterfall 310 and Ocean Breeze 320) until the temperature of the vehicle cabin reaches a comfortable temperature.

In some embodiments, display 300 may display a custom airflow icon 350 to allow a user 250 may to create custom flow paths. For example, in response to receiving a user selection of custom airflow icon 350, display 300 may display an interface 301 that allows a user to input one or more custom flow paths, as shown in FIG. 3B and described below FIG. 3B shows an illustration of an interface 301 on the display 300 of a vehicle, in accordance with some embodiments of the present disclosure. As described above, interface 301 may be displayed in response to a user selection of custom airflow icon 350 of FIG. 3A. The interface 301 may display a representation of a user 384. In some embodiments, a user 250 may input one or more flow paths (e.g., first curved flow path 341*a* and second curved flow path 341*b*) by user gestures on interface 301 (e.g., by tracing the flow paths on a touchscreen). Although two curved flow paths 341*a*, 341*b* are shown, this is merely one example, and any number of suitable flow paths with any desired two-dimensional shape may be input by a user 250 (e.g., a single flow path or more than two flow paths based on the number of independently controllable vents). In some embodiments, the path speed of each of the two flow paths 341*a*, 341*b* may correspond to the speed at which they are input the user 250. For example, if the user 250 quickly traces the first curved flow path 341*a* and slowly traces the second curved flow path 341*b*, the ventilation system may more quickly travers the first curved flow path 341*a* (e.g., based on the different path speeds). A user 250 may erase an input flow path using erase icon 321. After the user 250 is satisfied with one or more input flow paths, the user 250 may save the one or more input flow paths using save icon 331. Thereafter, a representation of the saved flow paths may be displayed by display 300, as discussed above with reference to FIG. 3B.

Figure 4:
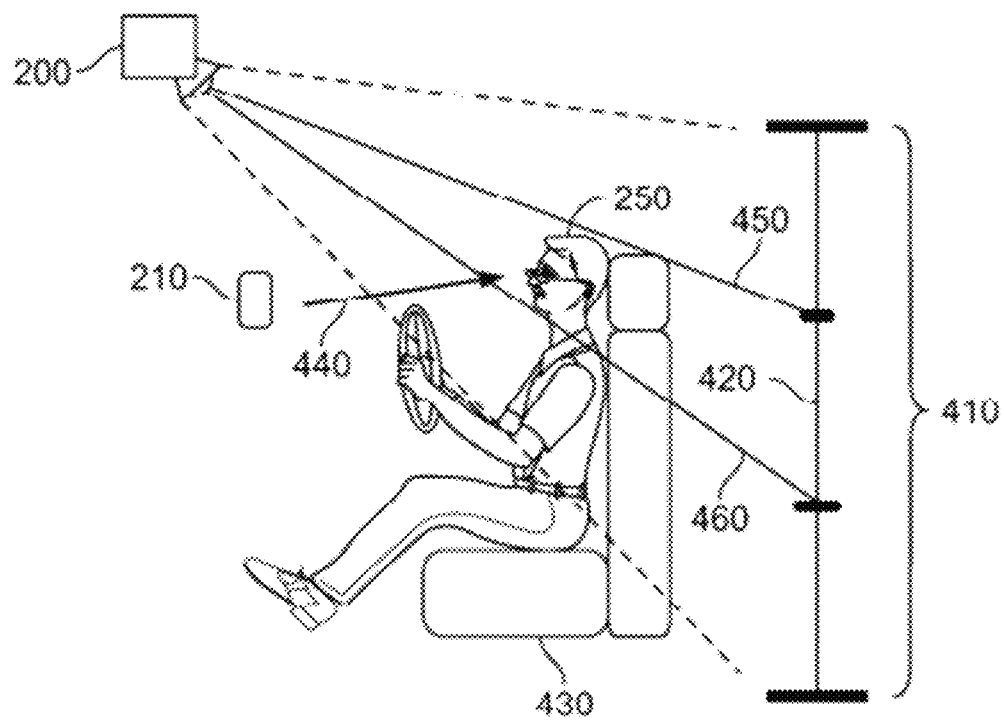
FIG. 4 shows an illustration of a side view of a user at the steering wheel of a vehicle, in accordance with some embodiments of the present disclosure.

FIG. 4 shows an illustration of a side view of a user 250 at the steering wheel of a vehicle, in accordance with some embodiments of the present disclosure. The user 250 is seated on adjustable vehicle seat 430. Camera 200 captures a 2D image of the interior of the vehicle spanning a height and width, the height of the image being represented by line 410. In FIG. 4, the user 250 is in view of camera 200, further illustrated by the fact that the user 250 is within the height represented by line 410. The camera 200 captures body parts of user 250 within the image as well. Objects in the image have corresponding widths and heights, which correspond to regions of the image. For example, the user's head is in the image. The height and vertical location of the head of user 250 corresponds to segment 420, which is the segment between the points where the sightline 450 from the camera to the top of the head and the sightline 460 from the camera to the bottom of the head 460 reach line 410, as seen in FIG. 4. The system may use information from the captured image to position vent 210 to direct airflow 440 towards one or more airflow paths relative to the location of the user 250. In some embodiments, the system may use calibration prompts to determine where a user usually sits. For example, up/down and left/right arrows could be displayed on display 300 for the user 250 to use to direct airflow to different body parts. The system may store this information in a calibration map and later refer to the calibration map to determine the location of the user 250.

Figure 5:
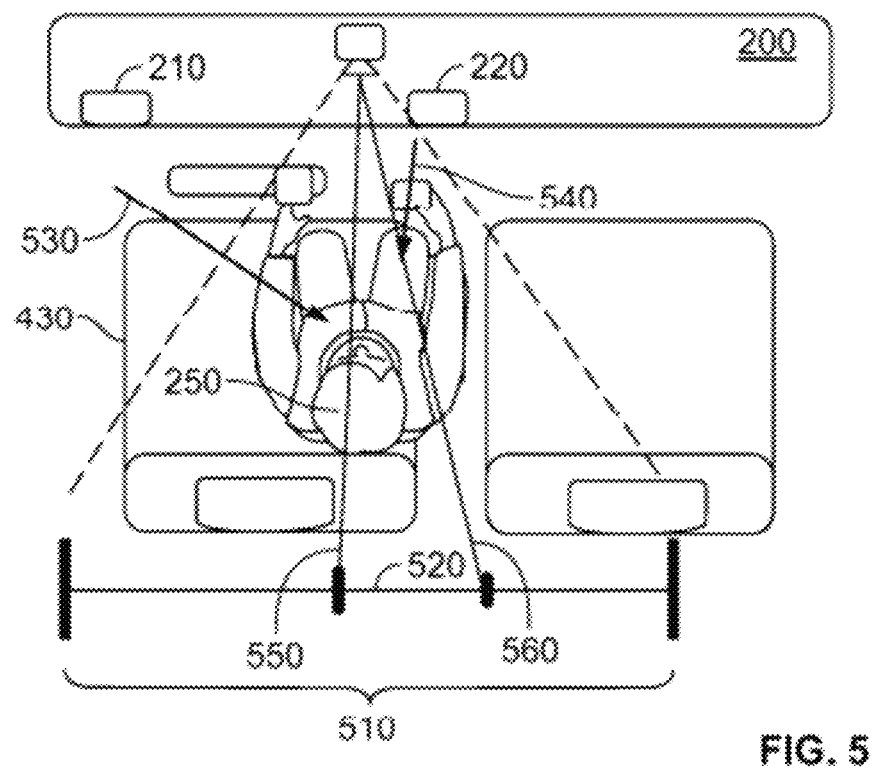
FIG. 5 shows an illustration of a bird's eye view of a user at the steering wheel of a vehicle, in accordance with some embodiments of the present disclosure.

FIG. 5 shows an illustration of a bird's eye view of a user 250 at the steering wheel of a vehicle, in accordance with some embodiments of the present disclosure. User 250 is leaning to the right side in this figure. Although the user 250 is not in a centered position, the system will still determine his or her position and the positions of his or her body parts that are relevant to any target direction the user 250 has selected. Camera 200 captures an image of the interior of the vehicle as discussed in the above paragraph. The width of the captured image is illustrated by line 510. As discussed above, objects within the image have a corresponding height and width, which correspond to regions in the image. The width of the head of user 250, for example, corresponds to segment 520, which is not centered within segment 520, which is the segment between the points where the sightline 550 from the camera to the left edge of the head and the sightline 560 from the camera to the right edge of the head reach line 510. When the user 250 chooses one or more flow paths, the system may use segments 420 and 520 (or the region corresponding to the segments) to locate the body of the user 250 within the image camera 200 captures. The body location within the image may then be used to determine the position of the body within the vehicle. It may then use this information, along with the known locations of the vents, to control the vents, shown as elements 210 and 220 in FIG. 5, and direct airflows 530 and 540 toward two separate flow paths (e.g., first and second curved flow paths 340a, 340b of FIG. 3A) to correspond to the representation of a user and selected flow paths, as illustrated in FIGS. 3A and 3B.

Figure 6:
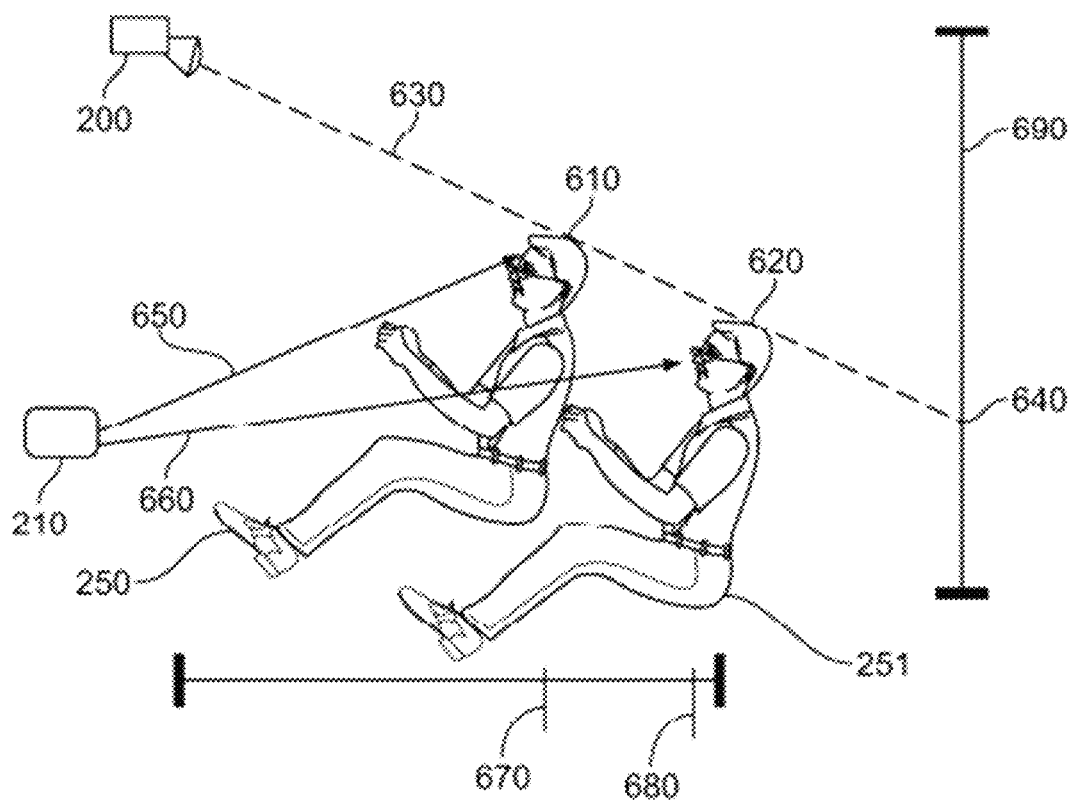
FIG. 6 shows an illustration of objects of different sizes and positions captured by a camera, in accordance with some embodiments of the present disclosure.

FIG. 6 shows an illustration of objects of different sizes and positions captured by a camera 200, in accordance with some embodiments of the present disclosure. In some embodiments, the position of the user 250 in the camera will depend on his or her distance from the camera 200. It should be noted that the image captured by camera 200 is a 2D image of a matrix of pixels, having height and width, while the user 250 exists in three-dimensional (3D) space having height, width, and depth. In some circumstances, objects of different dimensions and positions may be represented identically in the captured image due to the image's 2D capture of 3D space, as illustrated in FIG. 6. The captured image represents light, e.g., diagonal line 630, received at the lens of camera 200, where light from different directions is represented by different pixels in the captured image. When two objects are in the same line of sight, they will be represented by the same pixel or pixels in the captured image. However, the location of this pixel may not represent a single horizontal (or vertical) position in 3D space. The system may take into account the depth of the object to inform the system of the location of the object in 3D space. For example, as indicated in FIG. 6 the top of object 610, in this example the head of a user 250, is captured along light direction 630 and represented by point 640 in the vertical component of the captured image 690. The top of object 620, in this example the head of a second user 251, is also captured along light direction 630 and is represented by point 640 in the vertical component of captured image 690 despite being lower than object 610 in 3D space. It should be noted that while the objects 610 and 620 are in the same line of sight relative to camera 200, the vent directions to the two objects are not identical as shown by vent direction 650, from vent 210 to object 610, and vent direction 660, from vent 210 to object 620. The variation in vent directions illustrates the importance of correctly and accurately determining an object's position. In some embodiments, the depth of the objects is used to determine their positions in 3D space. In some embodiments, the system may rely on seat positions 670 and 680 to determine the position of objects and ultimately vent direction. The system may then calculate the horizontal (or vertical) locations of objects 610 and 620 in an image, and their positions in space, as a function of seat position 670, 680 and image region 640. In some embodiments, the system may only estimate the depth of user 250 based on seat position 670. For example, it may estimate the user's depth relative to the seat position. In other embodiments, the system may determine the size of a body part using a series of captured images of the body part and determine depth as a function of size, region, seat position, or a combination of these factors. Once the depth of user 250 is determined, the system may include this measurement to determine the 3D position of user 250, which in turn is used to calculate how to control vent position to more accurately direct airflows along the flow paths. The system may incorporate depth in its calculation of location using principles of geometry, a look up table, or other applicable means. While FIG. 6 illustrates finding locations on the vertical axis, the same principles may be applied in the horizontal axis as well.

Figure 7:
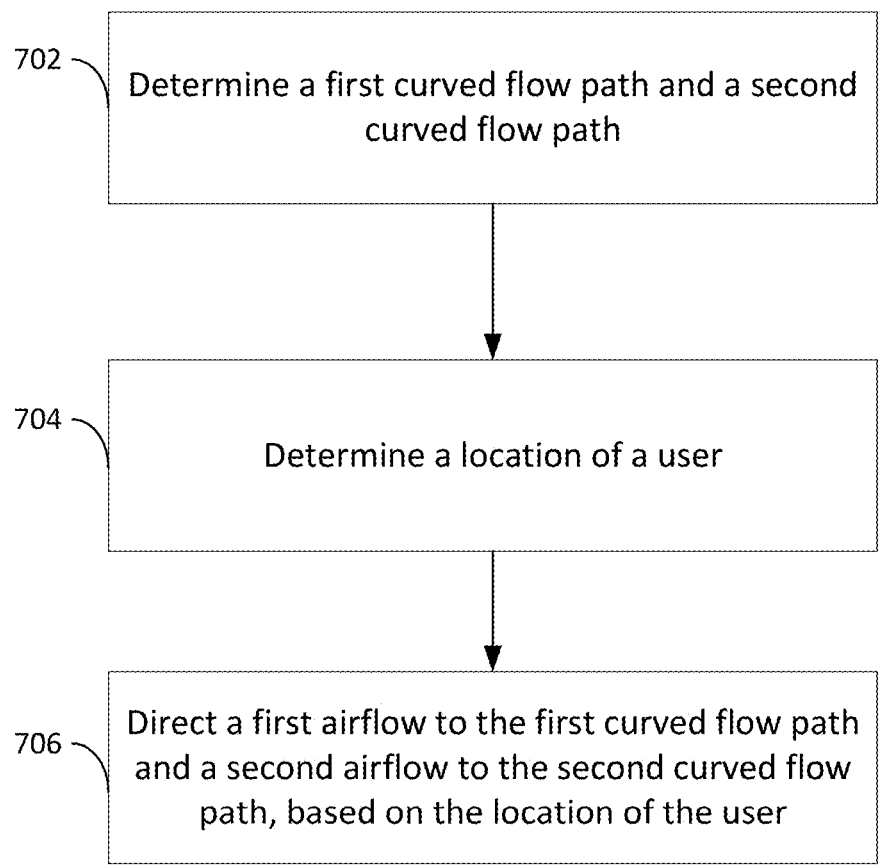
FIG. 7 shows a flowchart of a process for directing airflows along curved flow paths, in accordance with some embodiments of the present disclosure.

FIG. 7 shows a flowchart of a process 700 for directing airflows along curved flow paths, in accordance with some embodiments of the present disclosure. One or more steps of process 700 may be executed by processing circuitry 1004 (e.g., by processor 1005) or other components of FIG. 1.

At step 702, processing circuitry 1004 determines a first curved flow path and a second curved flow path. For example, a user 250 provides a user input to select a flow path option. The user 250 may select such an option using, for example, display 300. Flow path options may include, for example, preset flow paths, such as "Gentle Waterfall 310" and "Ocean Breeze 320," as shown in FIG. 3A. In some embodiments, the user 250 may input a custom flow path, as described above with reference to FIG. 3B.

Once the user 250 has made a selection or processing circuitry 1004 has made an automatic selection (e.g., based on a user profile), process 700 proceeds to step 704. At step 704, a location of the user 250 is determined. For example, the location of the user 250 is determined based on an image captured using camera 200 and/or based on the vehicle seat position of the user, as described above.

At step 706, the processing circuitry 1004 causes the ventilation system to direct a first airflow to the first curved flow path and a second airflow to the second curved flow path, based on the location of the user. For example, the processing circuitry 1004 sets the controllable feature (e.g., controllable features 210b and 220b). This may be accomplished by instructing the actuators 210a and 220a, or other motors, to direct the fins or other control mechanisms of the vents 210 and 220 to direct airflow follow the first and second curved flow path The system may calculate angles in each of the horizontal and vertical direction for each vent. Such calculations may be based on principles of geometry. The processing circuitry 1004 may also control path speed and direction and fan speed, as described above with reference to FIG. 3A.

The foregoing is merely illustrative of the principles of this disclosure, and various modifications may be made by those skilled in the art without departing from the scope of this disclosure. For example, in some embodiments, step 704 may be omitted from the process 700. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following paragraphs.

What is claimed is:

1. A system, comprising:
   a ventilation system configured to direct airflow; and
   processing circuitry, coupled to the ventilation system, configured to:
   determine a first curved flow path and a second curved flow path; and
   cause the ventilation system to direct a first airflow to the first curved flow path by controlling both a horizontal direction and a vertical direction of the first airflow and direct a second airflow to the second curved flow path.

2. The system of claim 1, wherein at least a portion of the first curved flow path and the second curved flow path intersect, and wherein the intersection redirects the first curved flow path and the second curved flow path.

3. The system of claim 1, wherein the processing circuitry is configured to determine a selection of the first curved flow path and the second curved flow path based on a user input that selects the first curved flow path and the second curved flow path from a plurality of predetermined flow paths.

4. The system of claim 1, further comprising a touchscreen,
wherein the processing circuitry is further configured to:
cause the touchscreen to display a plurality of predetermined flow paths; and
determine a selection of the first curved flow path and the second curved flow path based on a user input received by the touchscreen that indicates the selection of the first curved flow path and the second curved flow path from the plurality of predetermined flow paths.

5. The system of claim 1, further comprising a touchscreen,
wherein the processing circuitry is configured to determine the first curved flow path and the second curved flow path based on detecting, from the touchscreen, user gestures that indicate a shape of each of the first curved flow path and the second curved flow path.

6. The system of claim 1, wherein the processing circuitry is configured to:
determine a path speed based on a user input; and
cause the ventilation system to direct the first airflow to the first curved flow path by causing the ventilation system to direct the first airflow to follow the first curved flow path at the determined path speed.

7. The system of claim 1, wherein the first curved flow path and the second curved flow path are relative to a vehicle seat and wherein the processing circuitry is further configured to:
determine a location of the vehicle seat; and
cause the ventilation system to direct the first airflow to the first curved path and the second airflow to the second curved path based on the location of the vehicle seat.

8. The system of claim 1, wherein the processing circuitry is configured to determine a location of a user in a vehicle seat based on:
seat position information of the vehicle seat occupied by the user; and
a captured image of the user, and wherein the processing circuitry is configured to cause the ventilation system to direct the first airflow to the first curved path and the second airflow to the second curved path based on the location of the user in the vehicle seat.

9. The system of claim 1, wherein the processing circuitry is configured to cause the ventilation system to direct the first airflow to the first curved flow path and direct the second airflow to the second curved flow path by causing the ventilation system to repeatedly follow the first curved flow path in alternating directions and to repeatedly follow the second curved flow path in alternating directions.

10. The system of claim 1, wherein the processing circuitry is configured to cause the ventilation system to direct the first airflow to the first curved flow path and direct the second airflow to the second curved flow path by causing the ventilation system to sequentially follow the first curved flow path and the second curved flow path.

11. A method, comprising:
determining a first curved flow path and a second curved flow path; and
causing a ventilation system to direct a first airflow to the first curved flow path by controlling both a horizontal direction and a vertical direction of the first airflow and direct a second airflow to the second curved flow path.

12. The method of claim 11, wherein at least a portion of the first curved flow path and the second curved flow path intersect, and wherein the intersection directs the first airflow to the first curved flow path and directs the second airflow to the second curved flow path.

13. The method of claim 11, wherein determining the first curved flow path and the second curved flow path comprises:
determining a selection of the first curved flow path and the second curved flow path based at least on a user input that selects the first curved flow path and the second curved flow path from a plurality of predetermined flow paths; or
detecting, from a touchscreen, user gestures that indicate a shape of each of the first curved flow path and the second curved flow path.

14. The method of claim 11, wherein the first curved flow path and the second curved flow path are relative to a vehicle seat, and wherein the causing the ventilation system to direct the first airflow to the first curved flow path and direct the second airflow to the second curved flow path comprises:
determining a location of the vehicle seat; and
causing the ventilation system to direct the first airflow to the first curved path and the second airflow to the second curved path based on the location of the vehicle seat.

15. The method of claim 11, wherein causing the ventilation system to direct the first airflow to the first curved flow path and direct the second airflow to the second curved flow path comprises causing the ventilation system to repeatedly follow the first curved flow path in alternating directions and to repeatedly follow the second curved flow path in alternating directions.

16. A vehicle comprising:
an HVAC system configured to provide conditioned air, the HVAC system comprising an air vent configured to direct airflow of the conditioned air; and
processing circuitry, coupled to the HVAC system, configured to:
determine a first curved flow path and a second curved flow path; and
cause the air vent to direct a first airflow of the conditioned air to the first curved flow path by controlling both a horizontal direction and a vertical direction of the first airflow and direct a second airflow of the conditioned air to the second curved flow path.

17. The vehicle of claim 16, wherein at least a portion of the first curved flow path and the second curved flow path intersect.

18. The vehicle of claim 16, wherein the processing circuitry is configured to determine a selection of the first curved flow path and the second curved flow path based on:
a user input that selects the first curved flow path and the second curved flow path from a plurality of predetermined flow paths; or
a detection, from a touchscreen, of user gestures that indicate a shape of each of the first curved flow path and the second curved flow path.

19. The vehicle of claim 16, wherein the first curved flow path and the second curved flow path are relative to a user, and wherein the processing circuitry is further configured to:
determine a location of the user; and
cause the air vent to direct the first airflow of the conditioned air to the first curved path and the second airflow of the conditioned air to the second curved path based on the location of the user.

20. The vehicle of claim 19, further comprising:
an adjustable vehicle seat; and
a camera, wherein the processing circuitry is further configured to:
  receive one of:
    seat position information of the adjustable vehicle seat; or
    an image of the user captured by the camera; and
  determine the location of the user based on the received one of the seat position information or the image of the user.

* * * * *